Figure 1:
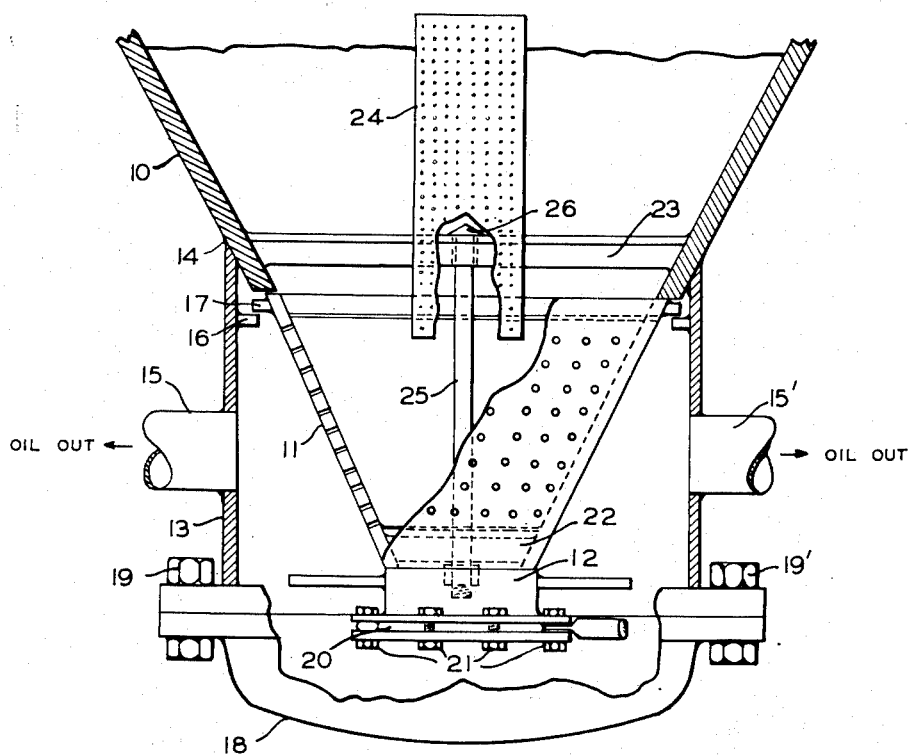

Jan. 12, 1954  R. E. TURKLESON ET AL  2,665,811
PERCOLATION FILTER

Filed Sept. 23, 1950  2 Sheets-Sheet 1

ROBERT E. TURKLESON
BILLY J. SHOWALTER
    INVENTORS

BY Raymond W. Barclay

ATTORNEY OR AGENT

Jan. 12, 1954  R. E. TURKLESON ET AL  2,665,811
PERCOLATION FILTER
Filed Sept. 23, 1950  2 Sheets-Sheet 2

ROBERT E. TURKLESON
BILLY J. SHOWALTER
*INVENTORS*

BY Raymond W. Barclay

ATTORNEY OR AGENT

Patented Jan. 12, 1954

2,665,811

UNITED STATES PATENT OFFICE 2,665,811

PERCOLATION FILTER

Robert E. Turkleson and Billy J. Showalter, Beaumont, Tex., assignors to Socony-Vacuum Oil Company, Incorporated, New York, N. Y., a corporation of New York Application September 23, 1950, Serial No. 186,328

3 Claims. (Cl. 210—171)

This invention relates to an equipment for improving the flow rate of liquid through a bed of particle-form contact material contained in a conical bottom vessel. More particularly, the present invention is concerned with an improvement in raising the throughput of conical bottom percolation filters wherein a liquid undergoing treatment is passed through a deep bed of particle-form adsorbent effecting removal therefrom of undesired materials such as sludge, impurities, color bodies, etc.

Conical bottom filtering columns are well known and are employed in a variety of industries wherein a liquid feed stock, generally under pressure, is passed through a percolation bed of adsorbent contact material of approximately 30–60 mesh particle size. Numerous adsorbent materials have been employed in such operations including various mineral clays, bauxite, fuller's earth, bentonite, silica gel, artificial mineral composites, charcoal, and the like.

One of the most extensive uses for conical bottom filters has been in the petroleum industry where a mineral oil fraction is decolorized or otherwise refined by passage through a bed of clay of a depth sufficient to provide a suitable length of contact between oil and clay. In commercial operations, the depth of clay bed is generally between about 15 and about 30 feet and the weight of clay involved ordinarily is in the range of 10 to 60 tons. After percolation of oil through the clay, the latter is washed with naphtha or other suitable oil-solvent to remove oil from the surface thereof. The clay charge is then steamed and after becoming spent upon continued use is removed by allowing it to flow from the bottom of the conical filter. The clay may subsequently be revivified by burning at an elevated temperature generally in the range of 1000–1200° F.

Conical bottom filters so employed are desirable for improving filter yields, for effecting speedy removal of spent adsorbents and for increasing efficiency in subsequent washing and steaming operations. Maximum utilization of such filters, however, has frequently not been realized due to a high pressure build-up in the restricted lower conical portion thereof, tending to counteract the flow of downcoming liquid through the bed of adsorbent. The extent of such pressure will readily be apparent when it is considered that generally tons of adsorbent contained in the filtering column are overlying the adsorbent contained in the lower conical portion of the filter. The tremendous pressure so exerted packs down the adsorbent in this restricted portion and percolation of the liquid feed therethrough becomes difficult. The filter rate is consequently decreased and the overall efficiency of the filter is thus greatly curtailed. Satisfactory operation of the filter cannot be insured unless the lower portion thereof is of such large diameter that the weight of materials required for construction becomes prohibitive.

It is a major object of this invention to overcome the aforesaid disadvantages encountered in the operation of conical bottom filters. A further object is to provide a means for insuring a smooth, rapid flow of liquid feed stock through a bed of particle-form adsorbent contact material contained in a conical bottom filter. A still further object is to increase the filter rate of liquid through the adsorbent bed without detriment to the filtration product and consequently to increase the efficiency of the filtering operation.

These and other objects which will be apparent to those skilled in the art are achieved in accordance with the instant invention. Broadly, it has been discovered that the pressure developed in the lower cone portion of conical bottom filters can be reduced by insertion of a screen type construction which increases the void area through which the liquid under treatment is withdrawn from the filter. It has been found, with the insertion of such screen construction, that a distinct and unexpected improvement in filtration rate of liquid passing through the filter is obtained.

While the description which follows hereinafter is particularly directed to the filtration of a petroleum stock by percolation through a bed of adsorbent clay, it will be recognized that the improvement of the present invention may likewise be employed in any other industrial application wherein percolation filtration through an adsorbent bed is carried out in a conical bottom filter.

Figure 5:
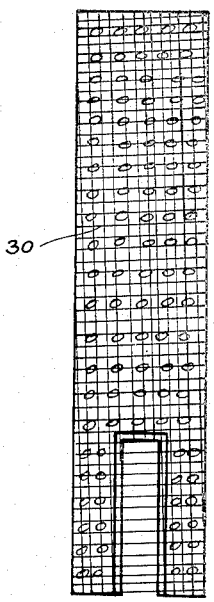
Figure 3:
Figure 6:
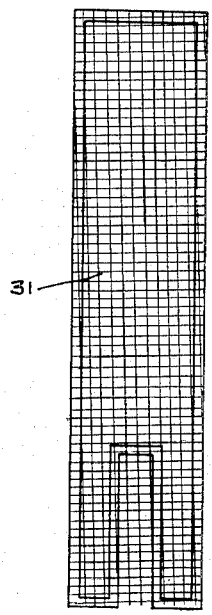
Figure 2:
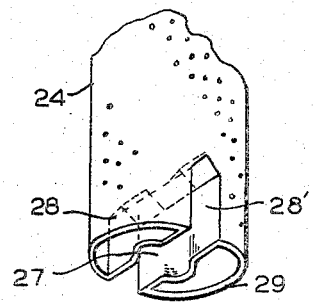
Figure 4:
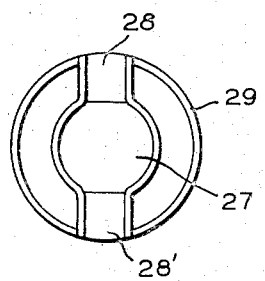

In the attached drawing, Figure 1 is an elevational view partly in section of the lower portion of a typical conical bottom filter provided with the auxiliary screen construction of this invention. Figure 2 shows a detail of the preferred auxiliary screen bottom. Figure 3 is an elevational view of one embodiment of the screen. Figure 4 is a cross-sectional view taken on line A—A of Figure 3. Figure 5 is an elevational view of an alternate embodiment of the screen. Figure 6 is an elevational view of another alternate embodiment of the screen.

Referring more particularly to Figure 1, numeral 10 designates a wall defining the lower conical portion of the filter. Below said wall and contiguous therewith is filtering cone 11 which is suitably composed of a perforated plate covered with one or more layers of fine mesh screen of a size sufficient to retain the particles of clay or other adsorbent within the filtering cone while permitting liquid to flow therethrough. Filtering cone 11 terminates in opening 12 which is maintained closed during the filtering operation but may be opened for removal of spent clay or for cleaning or other maintenance of the filtering cone. Surrounding cone 11 is a kettle 13, the upper edge of which is affixed to wall 10 at point 14. Piercing the walls of kettle 13 on either side thereof are conduits 15 and 15', permitting the filtered liquid to pass out from the interior of the kettle and to be conducted to storage. In the upper part of kettle 13 is a projecting ledge 16 extending around the inner periphery of the kettle. A circumferential extension 17 of filtering cone 11 rests upon ledge 16 and serves to support the cone. Kettle 13 is provided with a removable bottom 18 held in position by bolts 19 and 19'. Spent clay is periodically conducted from the interior of the filter by removing kettle bottom 18, and withdrawing cover plate 20 from bottom opening 12 after loosening bolts 21. Across bottom opening 12 is a supporting cross-bar 22. Similarly across the lower portion of wall section 10 is a supporting cross-bar 23.

Now in accordance with the present invention, an auxiliary screen construction 24 is inserted in the lower portion of filtering cone 11. This screen may be of any desired shape and is suitably mounted along the axis of the conical bottom filter overlying the bottom opening thereof to afford an increased void area through which liquid passing down through the filter is withdrawn and to thereby provide an increased rate of filtration of the downflowing liquid through the adsorbent filter media contained in filter cone 11.

Auxiliary screen 24 is a perforated hollow body having a plurality of perforations of such size as to restrain the passage of particle-form adsorbent while permitting the ready flow of liquid therethrough. Alternately, as shown in Figure 5, the auxiliary screen may be a perforated hollow body having perforations of a substantially greater size but covered with one or more layers of screening 30 of mesh size sufficient to restrain the particle-form adsorbent from entering the interior thereof but allowing liquid to flow therethrough. The auxiliary screen, as shown in Figure 6, may also be a framework 31 covered with one or more layers of screening of the above type to afford a hollow body capable of withholding the particle-form adsorbent but permitting liquid to flow therethrough. As a practical matter, the auxiliary screen of this invention will generally be constructed of a perforated metal plate covered with fine mesh screen similar to that used in the construction of filtering cone 11. The auxiliary screen may be held in position by any feasible means. One suitable means, as shown in Figure 1, involves mounting the screen on a rigid shaft 25, the lower end of which is bolted or otherwise affixed to cross-bar 22 and the upper end of which is affixed to cross-bar 23, terminating in a triangular-pointed end 26.

With the foregoing construction, the lower end of auxiliary screen 24 is, as shown in Figure 2, provided with a groove 27 having a triangular-shaped top designed to interfit over pointed end 26 of shaft 25 and to thus provide a stable support for the auxiliary screen resting thereon. The stability of screen 24 during such support is further insured by having the ends 28 and 28' of groove 27 of solid construction. Likewise, the frame 29 defining the lower periphery of screen 24 is suitably solid to prevent leakage of particle-form adsorbent and to further physically strengthen the overall screen construction.

The auxiliary screen 24 employed in accordance with the instant invention may be of any shape or form, it being only necessary for obtaining the improved results of this invention that a void be created in the adsorbent bed contained in the restricted lower conical portion of the filter of such size as to perceptibly increase the passage of liquid through said bed. Thus, the shape of the screen employed may be spherical, cylindrical, cubical, pyramidal or any other feasible form. Generally, however, a cylindrical screen such as shown in Figure 3 is to be preferred since such form of screen can be easily installed or removed through opening 12 with a minimum of effort while affording a void area of substantial size.

Having described the nature of this invention, the following specific comparative examples will serve to illustrate and emphasize the improved filtration rates to be realized in accordance with the use of the auxiliary screen construction described herein.

A forty-ton conical bottom filter containing an adsorbent of 26–40 mesh Attapulgus clay was employed for filtration of a mineral oil having a viscosity of approximately 110 S. U. V. at 210° F. The filtering temperature was about 200° F. The oil feed was conducted to the filter under pressure. The filtration rates for varying top pressures before and after the installation of an auxiliary screen of cylindrical construction comprising a perforated metal plate of about 2½ feet long and of about 4 inches in diameter, covered with a layer of 16 mesh metal screening and thereafter with a layer of 80 mesh metal screening, are tabulated below:

*Without auxiliary screen*

| Filter Top Pressure (pounds per square inch) | Filtration Rate (Barrels per hour) |
|---|---|
| 70 | 12.0 |
| 80 | 14.0 |
| 90 | 15.6 |
| 100 | 17.8 |

*With auxiliary screen*

| Filter Top Pressure (pounds per square inch) | Filtration Rate (Barrels per hour) |
|---|---|
| 70 | 25.6 |
| 80 | 32.2 |
| 90 | 37.4 |
| 100 | 44.2 |

The above comparative results are deemed self-explanatory. It is to be noted that in every instance, the filtration rate through the conical bottom filter was more than doubled by the auxiliary screen construction of this invention.

We claim:

1. An improved conical bottom filter for filtration of a liquid through an adsorbent bed comprising in combination a perforated, conical-shaped filtering element, a rigid vertical shaft affixed to the lower portion of said element and extending up into the interior thereof, a screen construction mounted on said shaft and positioned along the axis of said conical bottom filter, said screen construction comprising a perforated, hollow body confined wholly within the conical bottom of the filter and having perforations of a size sufficient to permit the flow of liquid through said body while restraining the passage of adsorbent therethrough, whereby a void is created in the body of the adsorbent contained in the conical bottom of said filter through which liquid may readily pass, thereby serving to increase the filtration rate of said liquid through said adsorbent bed.

2. A conical bottom filter adapted for the passage of liquid through a bed of particle-form adsorbent comprising in combination a perforated, conical-shaped filtering element, a rigid vertical shaft affixed to the lower portion of said element and extending up into the interior thereof, a screen construction mounted on said shaft along the axis of the conical bottom filter and overlying the bottom opening thereof, said screen construction being confined wholly within the conical bottom of the filter and comprising a perforated, hollow body covered with a screening of mesh size sufficient to permit the flow of liquid through said body while restraining the passage of adsorbent therethrough, whereby a void is created in the body of the adsorbent contained in the conical bottom of said filter through which liquid may readily pass, thereby serving to increase the filtration rate of said liquid through said bed of particle-form adsorbent.

3. An improved conical bottom filter for filtration of a liquid through an adsorbent bed comprising in combination a perforated, conical-shaped filtering element, a rigid vertical shaft affixed to the lower portion of said element and extending up into the interior thereof, a cylindrical screen construction mounted on said shaft and positioned along the axis of said conical bottom filter, the lower portion of said cylindrical screen being slotted to interfit over the upper extremity of said shaft, said screen construction comprising a perforated, hollow body confined wholly within the conical bottom of the filter and having perforations of a size sufficient to permit the flow of liquid through said body while restraining the passage of adsorbent therethrough, whereby a void is created in the body of the adsorbent contained in the conical bottom of said filter through which liquid may readily pass, thereby serving to increase the filtration rate of said liquid through said adsorbent bed.

ROBERT E. TURKLESON.
BILLY J. SHOWALTER.

References Cited in the file of this patent

UNITED STATES PATENTS

| Number | Name | Date |
|---|---|---|
| 921,115 | Jewell | May 11, 1909 |
| 1,007,929 | Deacon et al. | Nov. 7, 1911 |
| 2,218,715 | MacCormack | Oct. 22, 1940 |
| 2,331,961 | Clark | Oct. 19, 1943 |

FOREIGN PATENTS

| Number | Country | Date |
|---|---|---|
| 54,141 | Germany | Oct. 28, 1890 |